United States Patent
Hwang et al.

(10) Patent No.: US 9,148,780 B2
(45) Date of Patent: Sep. 29, 2015

(54) METHOD AND APPARATUS FOR SECURE DATA TRANSMISSION

(71) Applicant: LG ELECTRONICS INC., Seoul (KR)

(72) Inventors: Dae Sung Hwang, Anyang-si (KR); Il Min Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 220 days.

(21) Appl. No.: 13/801,663

(22) Filed: Mar. 13, 2013

(65) Prior Publication Data

US 2013/0266142 A1    Oct. 10, 2013

Related U.S. Application Data

(60) Provisional application No. 61/611,019, filed on Mar. 15, 2012, provisional application No. 61/751,222, filed on Jan. 10, 2013.

(51) Int. Cl.
| | |
|---|---|
| *H04K 1/00* | (2006.01) |
| *H04W 12/00* | (2009.01) |
| *H04W 12/12* | (2009.01) |
| *H04B 7/04* | (2006.01) |
| *H04B 7/06* | (2006.01) |

(52) U.S. Cl.
CPC ............ *H04W 12/00* (2013.01); *H04B 7/0452* (2013.01); *H04B 7/0456* (2013.01); *H04B 7/0617* (2013.01); *H04W 12/12* (2013.01)

(58) Field of Classification Search
CPC ..... H04W 24/08; H04W 72/02; H04W 88/08; H04W 72/0406; H04W 72/085
See application file for complete search history.

(56) References Cited

U.S. PATENT DOCUMENTS

| | | | |
|---|---|---|---|
| 8,391,392 B2 * | 3/2013 | Melzer et al. | 375/267 |
| 2006/0156009 A1 * | 7/2006 | Shin et al. | 713/176 |
| 2009/0022049 A1 * | 1/2009 | Zeng | 370/203 |
| 2009/0215480 A1 * | 8/2009 | Kim et al. | 455/501 |
| 2010/0142633 A1 * | 6/2010 | Yu et al. | 375/260 |
| 2011/0080969 A1 * | 4/2011 | Jongren et al. | 375/267 |
| 2011/0206154 A1 * | 8/2011 | Ding et al. | 375/267 |
| 2011/0261894 A1 * | 10/2011 | Yu et al. | 375/267 |
| 2011/0268204 A1 * | 11/2011 | Choi et al. | 375/260 |
| 2012/0063494 A1 * | 3/2012 | Frenne et al. | 375/219 |
| 2012/0082149 A1 * | 4/2012 | Kim et al. | 370/338 |
| 2012/0121034 A1 * | 5/2012 | Murakami et al. | 375/295 |

OTHER PUBLICATIONS

Shichuan Ma, Yaoqing (Lamar) Yang, Michael Hempel, & Hamid Sharif, Jul. 2, 2010, IWCMC, 2010, 1172-1176.*

* cited by examiner

*Primary Examiner* — Shewaye Gelagay
*Assistant Examiner* — Khoi Le
(74) *Attorney, Agent, or Firm* — Lee, Hong, Degerman, Kang & Waimey

(57) ABSTRACT

A method and apparatus for secured data transmission is provided. The base station determines a first precoding matrix based on channel information of an eavesdropper. The base station determines a second precoding matrix and a third precoding matrix. The base station generates the secure data by precoding first user data for a target user with the first precoding matrix and the second precoding matrix. The base station transmits the secure data signal to the target user. The second precoding matrix is determined based on the first precoding matrix and the first channel information. The third precoding matrix is determined based on the first channel information and the second channel information.

11 Claims, 6 Drawing Sheets

METHOD AND APPARATUS FOR SECURE DATA TRANSMISSION

CROSS-REFERENCE TO RELATED APPLICATION

Pursuant to 35 U.S.C. §119(e), this application claims the benefit of U.S. Provisional Patent Application Ser. No. 61/611,019, filed on Mar. 15, 2012, and U.S. Provisional Patent Application Ser. No. 61/751,222, filed on Jan. 10, 2013, the contents of which are all hereby incorporated by reference herein in their entirety.

BACKGROUND OF THE INVENTION

1. Field of the Invention

The present invention relates to data transmission schemes and more specifically to a method and apparatus for secure data transmission.

2. Related Art

Information security of wireless communications has become a very important issue with a growing number of wireless communication applications. Due to the broadcast nature of wireless medium, the wireless security is inherently more vulnerable than the wired security. In wireless networks, the eavesdropper may overhear signals transmitted from a transmitter and interpret the messages more easily than in wired networks.

In most of the existing methods to guarantee the security of transmitting signals, a transmitter generates signals coded by cryptography. Both a transmitter transmitting the signals coded by cryptography and a receiver receiving the signals coded by cryptography should have secret key to guarantee the security of the signals. Wireless communication system should perform key management to decode the signal coded by cryptography. However, performing the key management in a wireless communication system can be difficult and complex process. To overcome the difficult and complex operation of the key management in the wireless communication system, physical layer security techniques have been proposed.

Most of the works in the area of physical layer security have focused only on the scenario of point-to-point communications, i.e., the single user case, which typically involves one transmitter and one receiver in the presence of an eavesdropper. The natural extension is to consider multiple users. In particular, the case of multiple (legitimate) receivers, known as the broadcast channel (BC), is an important scenario.

Most of the works in the area of physical layer security are also based on an assumption which the eavesdropper's channel was assumed to be a degraded version of the legitimate user's channel. Later, This assumption should be extended to the non-degraded case, where the eavesdropper's channel is not necessarily a degraded version of the legitimate user's channel, and also applied to Gaussian channels.

SUMMARY OF THE INVENTION

The present invention provides secure transmission methods for a multi-user multiple-input multiple-output (MIMO) broadcast channel in the presence of at least one eavesdropper with multiple antennas.

The present invention also provides secure transmission apparatuses for a MIMO broadcast channel in the presence of at least one eavesdropper with multiple antennas.

According to the embodiments of the present invention, Eve can not receive data when channel information of Eve is known to a base station, and Eve can not demodulate received data properly when channel information of Eve is not known to the base station. Furthermore, the embodiment of the present invention can be applied to a multi-user MIMO system including many users having different security policy.

DESCRIPTION OF EXEMPLARY EMBODIMENTS

Figure 1:
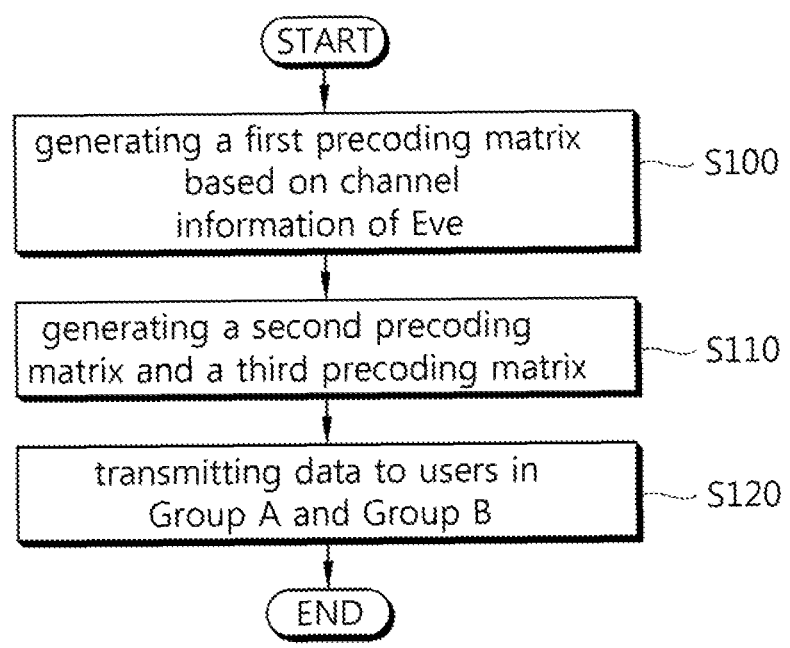
FIG. 1 is a flowchart illustrating the secure data transmission method when a base station knows perfect CSI (channel state information) of Eve.

A multi-user multiple-input multiple-output (MIMO) system composed of a base station with N transmit antennas and K legitimate users may be assumed to transmit and receive secret data. These legitimate users will be called simply users whenever there is no ambiguity. It may be also assumed that there exists one eavesdropper with $M_E$ receive antennas, which will be called Eve. In this work, the K legitimate users may be classified into two different groups.

(1) Group A: For each user in this group, the data must be kept secret at the physical layer from all other users as well as Eve.

(2) Group B: For each user in this group, the data do not need to be kept secret at the physical layer from any other users or Eve.

This model of two-groups can be considered as a generalization of the purely insecure system or the purely secure system: when Group A is empty, the system reduces to the purely insecure system; and when Group B is empty, the system reduces to the purely secure system. Also, the model of two-groups is useful when there exist some users who are downloading their personal data and the other users who are downloading publicly opened data such as web-browsing of newspapers. Or, one may consider the case of cross-layer optimization between the physical layer security and the cryptography. In this case, the users in Group B are the users for whom the secure links have been successfully established at a higher layer and the data are encrypted. For these users, therefore, the data may not need to be additionally secured at the physical layer. On the other hand, the users in Group A are the users for whom the secure links have not been established yet. Note that, until the establishment of secure links, the data including management frames of those users are not encrypted. For those users, therefore, it should be a good strategy to secure the data at the physical layer.

For Group A, the total number of users is denoted by $K_A$, the number of receive antennas for the k-th user is denoted by $M_k^A$, and the total number of receive antennas is denoted by $\Sigma_{k=1}^{K_A} M_k^A = M_A$.

For Group B, the total number of users is denoted by $K_B$, number of receive antennas for the k-th user is denoted by $M_k^B$, and the total number of receive antennas is denoted by $\sum_{k=1}^{K_B} M_k^B = M_B$.

The total number of receive antennas of all users excluding Eve is denoted by M, i.e., $M_A + M_B = M$. The base station may transmit $N_k^A$ data signals denoted by $x_k^A = [x_{k,1}^A, \ldots, x_{N_k^A}^A]^T$ to the k-th user of Group A and transmit $N_k^B$ data signals denoted by $x_k^B = [x_{k,1}^B, \ldots, x_{N_k^B}^B]^T$ to the k-th user of Group B.

In order to transmit the data reliably and secretly, the data may be precoded by $N \times N_k^A$ precoding matrices $T_k^A$ for the users in Group A and by $N \times N_k^B$ precoding matrices $T_k^B$ for the users in Group B. In other words, each precoding matrix $T_k^A$ and $T_k^B$ multiplies by the transmitting data $x_k^A$ and $x_k^B$ respectively. Then the total transmitted signal, denoted by $N \times 1$ vector x, is given by:

$$x = \sum_{i=1}^{K_A} T_i^A x_i^A + \sum_{i=1}^{K_B} T_i^B x_i^B \qquad \langle\text{equation 1}\rangle$$

where it is assumed that the number of symbol transmitted to user satisfies the conditions $N_k^A \leq M_k^A$, $N_k^B \leq M_k^B$, and It is also assumed that transmitting signal vector satisfies the conditions $E[x_i^A] = E[x_i^B] = 0$, $E[x_i^A(x_i^A)^H] = E[x_i^B(x_i^B)^H] = I$, and $E[x_i^A(x_i^B)^H] = 0$.

Considering the receiver, the received signals $r_k^A$ of user k in Group A $r_k^B$ and user k in Group B are given by:

$$r_k^A = H_k^A \sum_{i=1}^{K_A} T_i^A x_i^A + \eta_k^A, k = 1, \ldots, K_A \qquad \langle\text{equation 2}\rangle$$

$$r_k^B = H_k^B \sum_{i=1}^{K_B} T_i^B x_i^B + \eta_k^B, k = 1, \ldots, K_B$$

where $H_k^A$ is an $M_k^A \times N$ matrix representing the channel from the base station to the k-th user in Group A and $\eta_k^A$ represents the additive white Gaussian noise (AWGN) at the k-th user in Group A. For Group B, $H_k^B$ and $\eta_k^B$ are defined in the same way. The received signal at Eve represented by $M_E \times 1$ matrix is given by:

$$r_E = H_E \sum_{i=1}^{K_A} T_i^A x_i^A + H_E \sum_{i=1}^{K_B} T_i^B x_i^B + \eta_E \qquad \langle\text{equation 3}\rangle$$

where $H_E$ is an $M_E \times N$ matrix representing the channel from the base station to Eve and $\eta_E$ is an $M_E \times 1$ column vector representing the AWGN at Eve. A condition $E[\eta_E(\eta_E)^H] = N_E I_{M_E}$ is always satisfied.

In an embodiment of the present invention, it is always assumed that the CSI (channel state information), $H_K^A$ and $H_k^B$ of the legitimate users are perfectly known at the base station. The CSI $H_E$ of Eve, however, is assumed to be perfectly known or imperfectly known, which are considered in the embodiments of present invention described respectively.

1. Data transmission method when a base station knows perfect CSI of Eve.

The embodiment of present invention describes the case that $H_E$ (CSI of Eve) is perfectly known at the base station. The signal transmitted by the base station should be satisfy two objectives: i) the data $x_k^A$ should be kept secret from all other users in Group A, all users in Group B, and Eve; and ii) the data $x_k^A$ and $x_k^B$ should be reliably received by their intended users. In order to achieve the objectives, we set precoding matrix $T_k^A$ as follows:

$$T_K^A = T_{1,k}^A T_{2,k}^A \qquad \text{<equation 3>}$$

where $T_{1,k}^A$ is an $N \times L_k^A$ matrix designed to achieve the first objective and $T_{2,k}^A$ is an $L_k^A \times N_k^A$ matrix designed to achieve the second objective. $L_k^A$ may be selected to satisfy $L_k^A \geq N_k^A$.

Firstly, for secure data transmission of the first objective, $T_{1,k}^A$ is designed such that it is orthogonal to the channels of all other legitimate users and Eve as follows:

$$H_i^A T_{1,k}^A = O, i = 1, \ldots, k-1, k+1, \ldots, K_A$$

$$H_i^B T_{1,k}^A = O, i = 1, \ldots, K_B$$

$$H_E T_{1,k}^A = O \qquad \text{<equation 4>}$$

where O is a matrix, elements of which are all zero. $T_{1,k}$ may be calculated by performing singular value decomposition (SVD) to the matrix $\mathcal{H}_i$. The matrix $\mathcal{H}_i$ is given as follows:

$$\mathcal{H}_i = [H_E^T, (H_1^A)^T, \ldots, (H_{i-1}^A)^T, (H_{K_A}^A)^T, \qquad \langle\text{equation 5}\rangle$$

$$(H_1^B)^T, \ldots, (H_{K_B}^B)^T]^T$$

$$= U_i \Lambda_i [V_i, \tilde{V}_i]^H$$

where $U_i$ is an $(M_E + M - m_i^A) \times (M_E + M - M_i^A)$ unitary matrix composed of the left singular vectors of $\mathcal{H}_i$; $\Lambda_i$ is an $(M_E + M - M_i^A) \times N$ matrix composed of the singular values of $\mathcal{H}_i$; $V_i$ is an $N \times (M_E + M - M_i^A)$ matrix composed of the right singular vectors corresponding to the non-zero singular values; and $\tilde{V}_i$ is an $N \times (N - (M_E + M - M_i^A))$ matrix composed of the right singular vectors corresponding to the zero singular values. Selecting $L_K^A$ columns from $\tilde{V}_k$, matrix $\overline{V}_k$ can be an $N \times L_k^A$ matrix. $\overline{V}_k$ may be used as $T_{1,k}^A$ as follows:

$$T_{1,k}^A = \overline{V}_k \qquad \text{<equation 6>}$$

where the condition of $N - (M_E + M - M_k^A) \geq L_k^A \geq N_k^A$ must be satisfied. This method described above may be called block diagonalization (BD) to transmit the secure data.

With the precoding of $T_{1,k}^A$, the received signals at the users and Eve are given as follows:

$$r_k^A = H_k^A \left( \sum_{i=1}^{K_A} T_i^A x_i^A \right) + H_k^A \left( \sum_{i=1}^{K_B} T_i^B x_i^B \right) + \eta_k^A \qquad \langle\text{equation 7}\rangle$$

$$= H_k^A T_{1,k}^A T_{2,k}^A x_k^A + H_k^A \left( \sum_{i=1}^{K_B} T_i^B x_i^B \right) + \eta_k^A$$

$$r_k^B = H_k^B \left( \sum_{i=1}^{K_A} T_i^A x_i^A \right) + H_k^B \left( \sum_{i=1}^{K_B} T_i^B x_i^B \right) + \eta_k^B$$

$$= H_k^B T_k^B x_k^B + H_k^B \left( \sum_{i=1, i \neq k}^{K_B} T_i^B x_i^B \right) + \eta_k^B$$

-continued $$r_E = H_E\left(\sum_{i=1}^{K_A} T_i^A x_i^A\right) + H_E\left(\sum_{i=1}^{K_B} T_i^B x_i^B\right) + \eta_E$$

$$= H_E\left(\sum_{i=1}^{K_B} T_i^B x_i^B\right) + \eta_E$$

From the received signals, it is clear that the secret data $x_k^A$ is perfectly eliminated at all other users in Group A, all users in Group B, and Eve. The secret data $x_k^A$ is only transmitted to the k-th user in Group A. Perfect secrecy is achieved in this case as shown above equation 7.

Secondly, for reliable data transmission, i.e., the second objective, $T_{2,k}^A$ and $T_k^B$ may be generated such that the mean squared error between the transmit and receive signals is minimized. In particular to suppress the effect of the noise, the received signal vector is scaled by a weighting factor β. The optimum precoders are derived as follows:

$$\min_{\{T_{2,k}^A\},\{T_k^B\},\beta}\left[\|\beta^{-1} r_{AB} - x_{AB}\|^2\right]  \quad \langle\text{equation 8}\rangle$$

subject to $E[\|x\|^2]=P_{Tot}$,
where $x_{AB}=[(x_1^A)^T, \ldots, (x_{K_A}^A)^T, (x_1^B)^T, \ldots, (x_{K_B}^B)^T]^T$ and $r_{AB}=[(r_1^A)^T, \ldots, (r_{K_A}^A)^T, (r_1^B)^T, \ldots, (r_{K_B}^B)^T]^T$ The solution is given as follows:

$$T_{2,k}^A = \beta \overline{T}_{2,k}^A  \quad \langle\text{equation 9}\rangle$$

$$T_k^B = \beta \overline{T}_k^B$$

$$\beta = \left(\frac{P_{Tot}}{\sum_{i=1}^{K_A}\|T_{1,i}^A \overline{T}_{2,i}^A\|^2 + \sum_{i=1}^{K_B}\|\overline{T}_i^B\|^2}\right)^{1/2}$$

$$\overline{T}_{2,k}^A = \left((H_k^A T_{1,k}^A)^H H_k^A T_{1,k}^A + \frac{N}{P_{Tot}}I\right)^{-1}(H_k^A T_{1,k}^A)^H$$

$$\overline{T}_k^B = \left(\sum_{i=1}^{K_A}(H_i^A)^H H_i^A + \sum_{i=1}^{K_B}(H_i^B)^H H_i^B + \frac{N}{P_{Tot}}I\right)^{-1}(H_k^B)^H$$

where $$N = \sum_{i=1}^{K_A} \mathcal{N}_i^A M_i^A + \sum_{i=1}^{K_B} \mathcal{N}_i^B M_i^B.$$

If all users in the system are in Group A ($K_B=0$), The precoding matrix $T_k^A=T_{k,1}^A T_{k,2}^A$ eliminates the interference of other users by Block Diagonalization (BD) and eliminates the interference between symbols by MMSE (minimum mean square error).

On the contrary, If all users in the system are in Group B ($K_A=0$), The precoding matrix $T_k^B$ eliminates the interference of other users by block diagonalization (BD) and the interference between symbols by minimum mean square error (MMSE).

The embodiment of the present invention assumes the general case there are two user groups (Group A, Group B) having different data security requirements. The result represents general precoding matrixes when there are two groups having different data security requirement ($K_A\neq 0$, $K_B\neq 0$).

FIG. 1 is a flowchart illustrating the secure data transmission method when a base station knows perfect CSI of Eve.

FIG. 1 illustrates the secure data generating method of the base station.

According to FIG. 1, a base station generates the first precoding matrix based on exact channel information of Eve (step S100).

A procedure of generating the first precoding matrix $T_{1,k}^A$ is described through the equation 4, 5 and 6. The first precoding matrix is a precoding matrix applying to data transmitting to the users in Group A, the data transmitting to whom must be kept secret at the physical layer from all other users as well as Eve. The first precoding matrix $T_{1,k}^A$ can be used for protecting users' data in Group A from other users.

The base station generates the second precoding matrix and the third precoding matrix (step S110).

The second precoding matrix $T_{2,k}^A$ and the third precoding matrix $T_k^B$ can be generated by the equation 9 as described above. The second precoding matrix $T_{2,k}^A$ is a precoding matrix applying to data transmitting to the users in Group A. The second precoding matrix $T_{2,k}^A$ is used for minimizing the BER of signal transmitted to the users in Group A. The third precoding matrix $T_k^B$ is a precoding matrix applying to data transmitting to the users in Group B. The third precoding matrix $T_k^B$ is used for minimizing the BER of signal transmitted to the users in Group B.

The base station transmits data to users in Group A and Group B (step S120).

By using the generated precoding matrices, the base station transmits the signals to users in Group A and Group B. The signals transmitted to users in Group A can be precoded by the first precoding matrix $T_{1,k}^A$ and the second precoding matrix $T_{2,k}^A$. The signals transmitted to users in Group B can be precoded by the third precoding matrix $T_k^B$. The signals precoded by the first precoding matrix $T_{1,k}^A$ and the second precoding matrix $T_{2,k}^A$ can not be demodulated by Eve.

2. Data transmission method when a base station knows imperfect CSI of Eve.

The embodiment of present invention describes the case that only imperfect CSI of Eve is known at the base station. Let $\hat{H}_E$ denote Eve's CSI known at the base station, which is possibly different from the actual CSI HE. Suppose $H_E$ and $\hat{H}_E$ are related as follows:

$$\hat{H}_E = H_E + \overline{\epsilon}  \quad \langle\text{equation 9}\rangle$$

where $\overline{\epsilon}$ represents the uncertainty of Eve's channel. assuming that $\overline{\epsilon}$ is unknown to the base station; instead, only an upper-bound $\epsilon_{TH}$ of its Frobenius norm is known as follows:

$$\|\overline{\epsilon}\| \leq \epsilon_{TH}.  \quad \langle\text{equation 10}\rangle$$

Because the correct channel information for users $H_i^A$ and $H_i^B$ are available at the base station. However, $\hat{H}_E$ is only known to Eve. Specifically, $T_{1,k}^A$ which is the first precoding matrix for users in Group A is designed such that the following constraint is satisfied:

$$H_i^A T_{1,k}^A = O, i=1,\ldots,k-1,k+1,\ldots,K^A$$

$$H_i^B T_{1,k}^A = O, i=1,\ldots,K_B$$

$$\hat{H}_E T_{1,k}^A = O  \quad \langle\text{equation 11}\rangle$$

Then it is easy to see that the received signal at Eve is given as follows:

$$r_E = H_E \sum_{i=1}^{K_A} T_{1,i}^A T_{2,i}^A x_{2,i}^A + H_E \sum_{i=1}^{K_B} T_i^B x_i^B + \eta_E \quad \text{(equation 12)}$$

$$= (\hat{H}_E + \varepsilon) \sum_{i=1}^{K_A} T_{1,i}^A T_{2,i}^A x_i^A + H_E \sum_{i=1}^{K_B} T_i^B x_i^B + \eta_E$$

$$= \varepsilon \sum_{i=1}^{K_A} T_{1,i}^A T_{2,i}^A x_i^A + H_E \sum_{k=1}^{K_B} T_i^B x_i^B + \eta_E$$

where $\varepsilon = -\bar{\varepsilon}$.

Note that, at Eve, the secret data $x_k^A$ is not perfectly eliminated by the precoding $T_{1,k}^A$ due to existence of $\varepsilon$.

Figure 2:
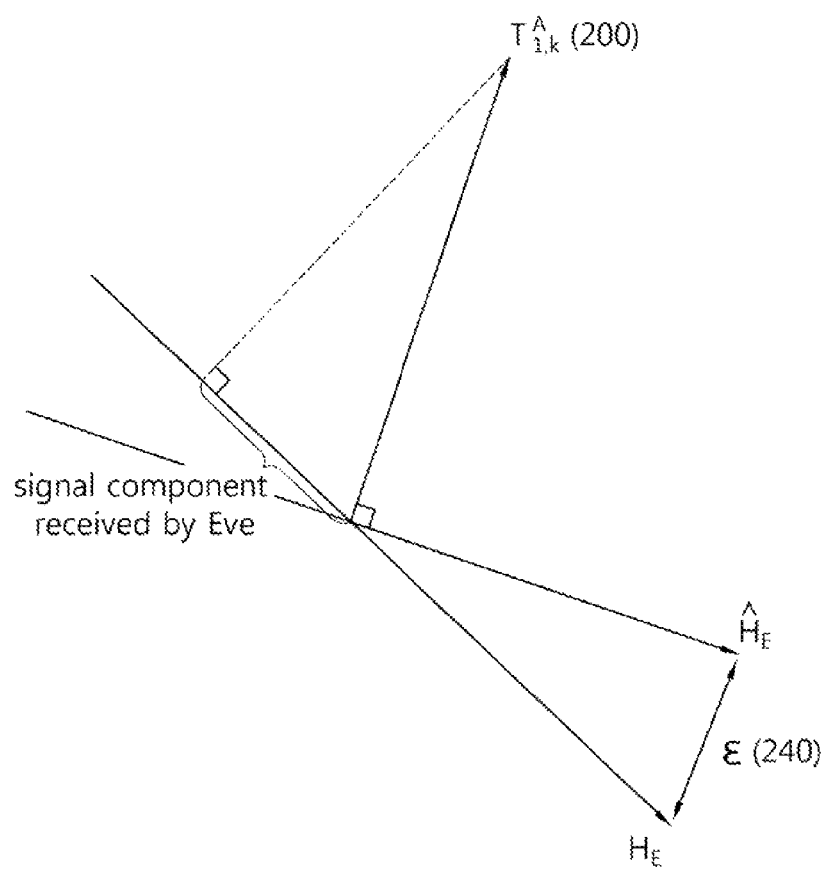
FIG. 2 is a conceptual view illustrating the signal received by Eve when the base station does not know channel information of Eve.

FIG. 2 is a conceptual view illustrating the signal received by Eve when the base station does not know channel information of Eve.

According to the FIG. 2, $T_{1,k}^A$ 200 is the first precoding matrix to the users in Group A.

The difference between the actual channel information of Eve and the channel information of Eve given to the base station is $\varepsilon$ 240. The secret data $x_k^A$ is not perfectly eliminated by the precoding matrix $T_{1,k}^A$ 200 due to existence of 240.

In fact, because the exact 240 is unknown, it is never possible to perfectly eliminate the secret data by utilizing any kind of precoding. The embodiment of the present invention propose a scheme which combines BD scheme and jamming scheme. More concretely, A transmit signal adding jamming signal $x_J$ may be transmitted by the base station. The transmitting signal adding jamming signal $x_J$ is generated as follow:

$$x = \sum_{i=1}^{K_A} T_i^A x_i^A + \sum_{i=1}^{K_B} T_i^B x_i^B + x_J \quad \text{(equation 13)}$$

The equation 13 represents the transmit signal adding jamming signal $x_J$. Let $x_J$ denote the jamming vector that is added to the transmitted signal in order to confuse Eve.

The power to transmit signal except the jamming signal is given as follows:

$$(1-\alpha)P_{Tot} = E\left[\left\|\sum_{i=1}^{K_A} T_i^A x_i^A + \sum_{i=1}^{K_B} T_i^B x_i^B\right\|^2\right] \quad \text{(equation 14)}$$

According to equation 14, $E[\|x\|^2]=P_{Tot}$ again represents the total power. $\alpha$ may be For $0 \leq \alpha < 1$, it is assumed that the jamming power portion is $\alpha P_{Tot}$, i.e., $E[\|x\|^2]=P_{Tot}$. The remaining power eliminating the jamming power is used for signal transmission.

Then the received signals at the users and Eve are respectively given by equations as follow:

$$r_k^A = H_k^A T_{1,k}^A T_{2,k}^A x_k^A + H_k^A \sum_{i=1}^{K_B} T_i^B x_i^B + H_k^A x_J + \eta_k^A \quad \text{(equation 15)}$$

-continued $$r_k^B = H_k^B \sum_{i=1}^{K_B} T_i^B x_i^B + H_k^B x_J + \eta_k^B$$

$$r_E = H_E \sum_{i=1}^{K_A} T_{1,i}^A T_{2,i}^A x_i^A + H_E \sum_{i=1}^{K_B} T_i^B x_i^B + H_E x_J + \eta_E$$

where $T_{1,k}^A$ is generated by the way using He described above. The way calculating $T_{2,k}^A$ and $T_{1,k}^A$ are described later. The Jamming signal $x_J$ will be designed based on two criterions: i) $x_J$ should be effectively designed such that it is working jointly with $T_{1,k}^A$ and ii) $x_J$ must not interfere with the legitimate users. To this end, Jamming vector $x_J$ satisfying the two criterions given as follow:

$$x_J = \sum_{i=1}^{K_A} F_{1,i} f_{2,i} x_i^J \quad \text{(equation 16)}$$

where $F_{1,i}$ is an $N \times L_i^A$ matrix used to jam Eve and $f_{2,i}$ is an $L_i^A \times 1$ column vector used not to interfere users. The jamming signals $x_i^J$ are given by i.i.d. independent random signals. $x_i^J$ is a jamming signal generated by a random number. Hereinafter, the following embodiment describes the way determining $F_{1,i}$, $f_{2,i}$, $T_{2,k}^A$ and $T_k^B$.

(1) Determining of $F_{1,i}$

In this embodiment of the present invention, sending the jamming signal in the direction of $\hat{H}_E$, which is known at the base station is never efficient, because the secret data $x_k^A$ is transmitted after being multiplied by the BD based precoder $T_{1,k}^A$.

Figure 3:
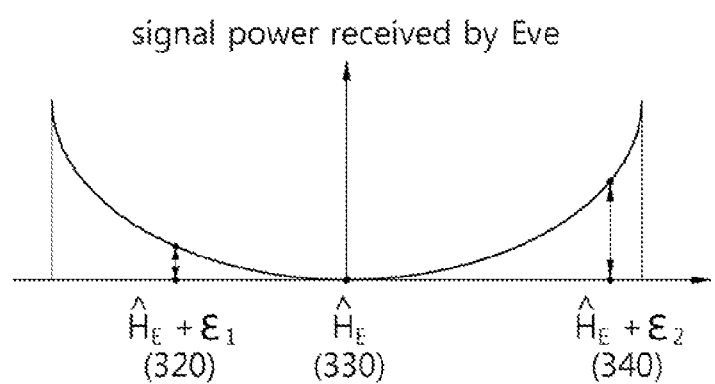
FIG. 3 is a conceptual view illustrating an embodiment of the received signal power of the secret data at Eve.

FIG. 3 is a conceptual view illustrating an embodiment of the received signal power of the secret data at Eve.

According to FIG. 3, first of all, one can see that the received power of the secret data is already zero in the direction of $\hat{H}_E$ 300, because the precoder $T_{1,k}^A$ is designed to be orthogonal to $\hat{H}_E$ 300. Therefore, there is no reason to send the jamming signal in the direction of $\hat{H}_E$ 300. Furthermore, one can see from FIG. 3 that the received power of the secret data is non-zero in the direction of $\hat{H}_E + \varepsilon$, where Eve is actually located. Note that the amount of the received signal power of the secret data depends on the magnitude of $\varepsilon$.

For example, in FIG. 3, if Eve is located at $\hat{H}_E + \varepsilon_2$ 340, the received signal power is higher compared to the case of $\hat{H}_E + \varepsilon_1$ 320. Note, however, that the exact amount of the received power of the secret data at Eve is unknown to the base station, because E is unknown.

Motivated by the discussion above, $F_{1,k}$ may be designed as follow. Clearly, in a particular direction, if the received signal power of the secret data is zero at Eve, no jamming is needed in that direction. In the direction where non-zero signal power of the secret data can be received at Eve, then some jamming is needed. In particular, it is desirable to make the jamming power proportional to the received signal power of the secret data.

Figure 4:
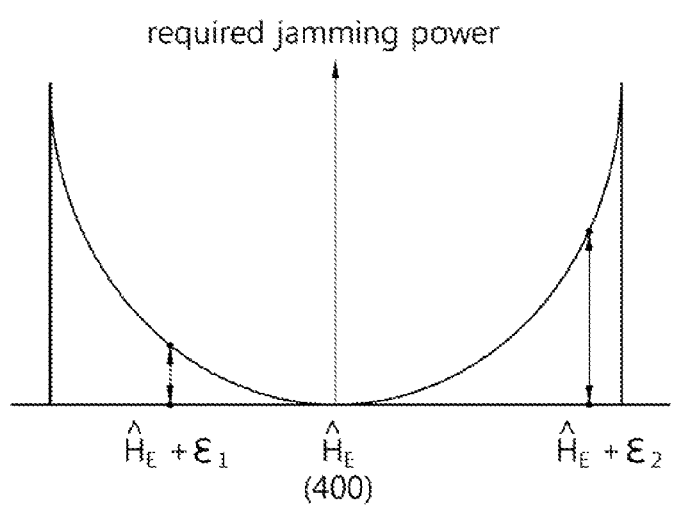
FIG. 4 is a conceptual view illustrating an embodiment of the jamming power proportional to the received signal power of the secret data.

FIG. 4 is a conceptual view illustrating an embodiment of the jamming power proportional to the received signal power of the secret data.

According to FIG. 4, no jamming power is required in the direction of $\hat{H}_E$ 400, and (more) jamming power is required in the direction of $\hat{H}_E + \varepsilon$ with non-zero (larger) $\varepsilon$.

The jamming precoding matrix $F_{1,k}$ is determined as follows:

$$F_{1,k} = T_{1,k}^A \quad \text{<equation 17>}$$

Consequently, the received signal at Eve is given as follows:

$$r_E = \sum_{i=1}^{K_A} \varepsilon T_{1,i}^A T_{2,i}^A x_i^A + H_E \sum_{i=1}^{K_B} T_i^B x_i^B + \sum_{i=1}^{K} \varepsilon T_{1,i}^A f_{2,i} x_i^J + \underbrace{\eta_E}_{(d)} \quad \text{(equation 18)}$$
$$\underbrace{\phantom{xxxxxx}}_{(a)} \underbrace{\phantom{xxxxxx}}_{(b)} \underbrace{\phantom{xxxxxx}}_{(c)}$$

Note that (a) is the signal component and (b) is the transmitting signals to users in Group B, which is the interference at Eve. (c) is the jamming component multiplied by $\epsilon$ and (d) is AWGN (additive white gaussian noise). Determining Jamming precoding matrix as equation 17 has advantageous effect as described below. First of all, the signal component $x_i^A$ and the jamming component $x_i^J$ are multiplied by $\epsilon$. Therefore, if more signal power of the secret data is received at Eve due to larger $\epsilon$, more jamming power is automatically imposed at Eve. If $\epsilon$ happens to be zero (in short, $H_E = \hat{H}_E$), the power of the signal component is zero. In this case, the jamming component of our proposed scheme automatically also becomes zero.

Substituting $F_{1,k} = T_{1,k}^A$ the received signals at the users are given as follows:

$$r_k^A = H_k^A T_{1,k}^A T_{2,k}^A x_k^A + H_k^A \sum_{i=1}^{K_B} T_i^B x_i^B + \quad \text{(equation 18)}$$
$$H_k^A \sum_{i=1}^{K_A} T_{1,i}^A f_{2,i} x_i^J + \eta_k^A$$
$$= H_k^A T_{1,k}^A T_{2,k}^A x_k^A + H_k^A \sum_{i=1}^{K_B} T_i^B x_i^B +$$
$$H_k^A T_{1,k}^A f_{2,k} x_k^J + \eta_k^A$$

$$r_k^B = H_k^B \sum_{i=1}^{K_B} T_i^B x_i^B + H_k^B \sum_{i=1}^{K_A} T_{1,i}^A f_{2,i} x_i^J + \eta_k^B$$
$$= H_k^B \sum_{i=1}^{K_B} T_i^B x_i^B + \eta_k^B$$

As represented in equation 18, By using $F_{1,k}$, the jamming signal $x_J$ is not received by any users in Group B. This is one of advantages by substituting $F_{1,k} = T_{1,k}^A$. For the users in Group A, however, the received jamming signal is non-zero. To eliminate the received jamming signal, the signal received by users in Group A is described as follows:

$$r_k^A = \tilde{H}_k^A T_{2,k}^A x_k^A + H_k^A \sum_{i=1}^{K_B} T_i^B x_i^B + \tilde{H}_k^A f_{2,k} x_k^J + \eta_k^A \quad \text{(equation 19)}$$

where $\tilde{H}_k^A = H_k^A T_{1,k}^A$ is a $M_k^A \times L_k^A$ matrix. In the equation 19 described above, $\tilde{H}_k^A f_{2,k} x_k^J$, is the received jamming signal received by users. This received jamming signal should be eliminated. In other words, the vector $f_{2,k}$ is generated to satisfy the equation as follows:

$$\tilde{H}_k^A f_{2,k} = 0 \quad \text{<equation 20>}$$

To determine $f_{2,k}$ satisfying the condition described above, the SVD of $\tilde{H}_k^A$ may be determined as follows:

$$\tilde{H}_k^A = A_k \Sigma_k [B_k \overline{B}_k]^H \quad \text{<equation 21>}$$

where $A_k$ is an $M_k^A \times M_k^A$ unitary matrix composed of the left singular vectors of $\tilde{H}_k^A$. $\Sigma_k$ is a $M_k^A \times L_k^A$ diagonal matrix composed of the singular values. $B_k$ is an $L_k^A \times M_k^A$ matrix composed of the right singular vectors corresponding to non-zero singular values, and $\overline{B}_k$ is an $L_k^A \times (L_k^A - M_k^A)$ matrix composed of the right singular vectors corresponding to zero singular values. Then a single column $\overline{b}_k$ from $\overline{B}_k$ can be selected as $f_{2,k}$ as follows:

$$f_{2,k} = \overline{b}_k \quad \text{<equation 22>}$$

For existence of such $\overline{b}_k$, the condition of $L_k - M_k \geq 1$ or $L_k \geq M_k + 1$ must be satisfied. Combined with the condition of $N - (M_E + M - M_k) \geq L_k$, which was needed for construction of $T_{1,k}^A$, the following equation 23 which is condition of the number of the receiving antenna must be satisfied.

$$N \geq M + M_E + 1 \quad \text{<equation 23>}$$

Substituting $f_{2,k} = \overline{b}_k$ into equation 19, the received signal can be rewritten as follows:

$$r_k^A = H_k^A T_{1,k}^A T_{2,k}^A x_k^A + H_k^A \sum_{i=1}^{K_B} T_i^B x_i^B + \eta_k^A \quad \text{(equation 24)}$$

As shown in equation 24, users in Group A do not receive the jamming signal. The received signals $r_k^A$ and $R_k^B$ generated when the base station knows exact CSI of Eve are same as the received signals $r_k^A$ and $R_k^B$ generated when the base station does not knows exact CSI of Eve. Therefore, the precoding matrices $T_{2,k}^A$ and $T_k^B$ may be obtained by the same way described in the case of perfect CSI of Eve. One different thing is transmitting power which can be allocated to the users is $(1-\alpha) P_{Tot}$. $(1-\alpha) P_{Tot}$ is transmission power except the jamming power. Thus, the precoding matrices are shown as follows:

$$T_{2,k}^A(\alpha) = \beta(\alpha) \overline{T}_{2,k}^A(\alpha) \quad \text{(equation 24)}$$
$$T_k^B(\alpha) = \beta(\alpha) \overline{T}_k^B(\alpha)$$
$$\beta(\alpha) = \left( \frac{(1-\alpha)P_{Tot}}{\sum_{i=1}^{K_A} \left\| T_{1,i}^A T_{2,i}^A(\alpha) \right\|^2 + \sum_{i=1}^{K_B} \left\| T_i^B(\alpha) \right\|^2} \right)^{1/2}$$

where $$\overline{T}_{2,k}^A(\alpha) =$$
$$\left( (H_k^A T_{1,k}^A)^H H_k^A T_{1,k}^A + \frac{\overline{N}}{(1-\alpha)P_{Tot}} I \right)^{-1} (H_k^A T_{1,k}^A)^H$$

$$\overline{T}_k^B(\alpha) = \left( \sum_{i=1}^{K_A} (H_i^A)^H H_i^A + \sum_{i=1}^{K_B} (H_i^B)^H H_i^B + \frac{\overline{N}}{(1-\alpha)P_{Tot}} I \right)^{-1}$$
$$(H_k^B)^H$$

$$\overline{N} = \sum_{i=1}^{K_A} \mathcal{N}_i^A M_i^A + \sum_{i=1}^{K_B} \mathcal{N}_i^B M_i^B ..$$

According to the embodiment of the present invention, the jamming power optimization may be performed by the base station. Note that $T_{2,k}^A$ and $T_k^B$ is the precoding matrixes depends on $\alpha$ and an $\alpha$ is also important parameter to determine jamming power $\alpha P_{Tot}$.

The purpose of the Jamming is to increase bit error rate (BER) of Eve when Eve demodulates data. Signal-to-interference-jamming-noise ratio (SIJNR) represents the state of the signal received at Eve.

Received signal at Eve is represented as follow:

$$r_E = \varepsilon \sum_{i=1}^{K_A} T_{1,i}^A T_{2,k}^A(\alpha) x_i^A + H_E \sum_{i=1}^{K_B} T_i^B(\alpha) x_i^B +$$
$$\varepsilon \sum_{i=1}^{K_A} T_{1,i}^A f_{2,i} x_i^J + \eta_E$$
$$= H_E \sum_{i=1}^{K_A} T_{1,i}^A T_{2,k}^A(\alpha) x_i^A + H_E \sum_{i=1}^{K_B} T_i^B(\alpha) x_i^B +$$
$$H_E \sum_{i=1}^{K_A} T_{1,i}^A f_{2,i} x_i^J + \eta_E$$
⟨equation 25⟩ then, SIJNR $\gamma^{E(\varepsilon,\alpha)}$ is represented as follows:

$$\gamma^E(\varepsilon, \alpha) = \frac{E\left[\left\|H_E \sum_{i=1q}^{K_A} T_{1,i}^A T_{2,k}^A(\alpha) x_i^A\right\|^2\right]}{E\left[\left\|H_E \sum_{i=1}^{K_B} T_i^B(\alpha) x_i^B + H_E \sum_{i=1}^{K_A} T_{1,i}^A f_{2,i} x_i^J + \eta_E\right\|^2\right]}$$
$$= \frac{E\left[\left\|\varepsilon \sum_{i=1}^{K_A} T_{1,i}^A T_{2,k}^A(\alpha) x_i^A\right\|^2\right]}{E\left[\left\|H_E \sum_{i=1}^{K_B} T_i^B(\alpha) x_i^B\right\|^2\right] + E\left[\left\|\varepsilon \sum_{i=1}^{K_A} T_{1,i}^A f_{2,i} x_i^J\right\|^2\right] + E[\|\eta_E\|^2]}$$
⟨equation 26⟩

As shown in the equation 26, SIJNR $\gamma^{E(\varepsilon,\alpha)}$ is a function of $\varepsilon$. However, exact value of $\varepsilon$ is unknown at the base station. In this work, for analytical tractability, an upper bound and a lower bound of $\gamma^{E(\varepsilon,\alpha)}$ can be considered and then derive the worst-case SIJNRs of the bounds. Using the triangular inequality, a lower bound of SIJNR is represented as follows:

$$\gamma^E(\varepsilon, \alpha) \geq \left(E\left[\left\|\varepsilon \sum_{i=1}^{K_A} T_{1,i}^A T_{2,k}^A(\alpha) x_i^A\right\|^2\right]\right)$$
$$\left(E\left[\left\|\hat{H}_E \sum_{i=1}^{K_B} T_i^B(\alpha) x_i^B\right\|^2\right] + E\left[\left\|\varepsilon \sum_{i=1q}^{K_B} T_i^B(\alpha) x_i^B\right\|^2\right] +$$
$$E\left[\left\|\varepsilon \sum_{i=1}^{K_A} T_{1,i}^A f_{2,i} x_i^J\right\|^2\right] + E[\|\eta_E\|^2]\right)^{-1} =: \gamma_L^E(\varepsilon, \alpha).$$
⟨equation 27⟩ and a higher bound of SIJNR is represented as follows:

$$\gamma^E(\varepsilon, \alpha) \leq \frac{E\left[\left\|\varepsilon \sum_{i=1}^{K_A} T_{1,i}^A T_{2,k}^A(\alpha) x_i^A\right\|^2\right]}{E\left[\left\|\varepsilon \sum_{i=1}^{K_A} T_{1,i}^A f_{2,i} x_i^J\right\|^2\right] + E[\|\eta_E\|^2]} =: \gamma_U^E(\varepsilon, \alpha).$$
⟨equation 28⟩ the worst case SIJNR is derived by the lower bound of SIJNR and the higher bound of SIJNR.

$$\max_{\{\varepsilon:\|\varepsilon\| \leq \varepsilon_{TH}\}} \gamma_L^E(\varepsilon, \alpha) = \lambda_{max}(\mathcal{R}_L(\alpha))$$
⟨equation 29⟩
$$\max_{\{\varepsilon:\|\varepsilon\| \leq \varepsilon_{TH}\}} \gamma_U^E(\varepsilon, \alpha) = \lambda_{max}(\mathcal{R}_U(\alpha))$$

provided, equation 30 should be satisfied.

$$\mathcal{R}_L(\alpha) = (R_I(\alpha) + R_J(\alpha) + R_N)^{-1} R_S(\alpha)$$
$$\mathcal{R}_U(\alpha) = (R_J(\alpha) + R_N)^{-1} R_S(\alpha).$$
<equation 30>

The equation represented above, $R_S(\alpha)$, $R_I(\alpha)$, $R_J(\alpha)$, and $R_N(\alpha)$ are given as follows:

$$R_S(\alpha) =$$
$$\sum_{k=1}^{K_A} \sum_{i=1}^{N_k^A} \left((t_{k,i}^A(\alpha))^T \otimes I_{M_E \times M_E}\right)^H \left((t_{k,i}^A(\alpha))^T \otimes I_{M_E \times M_E}\right)$$
⟨equation 31⟩

$$R_I(\alpha) = \frac{1}{\varepsilon_{TH}^2} \left(\sum_{k=1}^{K_B} \sum_{i=1}^{N_k^B} (t_{k,i}^B(\alpha))^H \hat{H}_E^H \hat{H}_E t_{k,i}^B(\alpha)\right) I_{NM_E \times NM_E} +$$
$$\sum_{k=1}^{K_B} \sum_{i=1}^{N_k^B} \left((t_{k,i}^B(\alpha))^T \otimes I_{M_E \times M_E}\right)^H \left((t_{k,i}^A(\alpha))^T \otimes I_{M_E \times M_E}\right)$$

$$R_J(\alpha) = \frac{\alpha P_{Tot}}{\left\|\sum_{k=1}^{K_A} T_{1,k}^A f_{2,k}\right\|^2}$$
$$\sum_{k=1}^{K_A} \left((T_{1,k}^A f_{2,k})^T \otimes I_{M_E \times M_E}\right)^H \left((T_{1,k}^A f_{2,k})^T \otimes I_{M_E \times M_E}\right)$$

$$R_N = \frac{N_E M_E}{\varepsilon_{TH}^2} I_{NM_E \times NM_E}$$

where ⊗ denotes the Kronecker product, $t_{k,i}^A(\alpha)$ is the i-th column of $T_k^A(\alpha) = T_{1,k}^A T_{2,k}^A(\alpha)$, and $t_{k,i}^B(\alpha)$ is the i-th column of $T_k^B(\alpha)$.

For optimization of α, the maximum SIJNR of Eve must be constrained to be a pre-determined threshold γTH. Note that the γTH value should be chosen appropriately in order to ensure that the decoding error probability at Eve is high enough and this will be numerically demonstrated in the next section. Given γTH, we can determine the minimum jamming power, $\alpha_{opt} P_{Tot}$, using the derived worst-case SIJNR expressions as follows:

$$\alpha_{opt} = \min_{0 \leq \alpha < 1} \alpha \text{ subject to } \lambda_{max}(\mathcal{R}(\alpha)) \leq \gamma_{TH}$$
⟨equation 32⟩
where $\mathcal{R}(\alpha) \in \{\mathcal{R}_L(\alpha), \mathcal{R}_U(\alpha)\}$.

Figure 5:
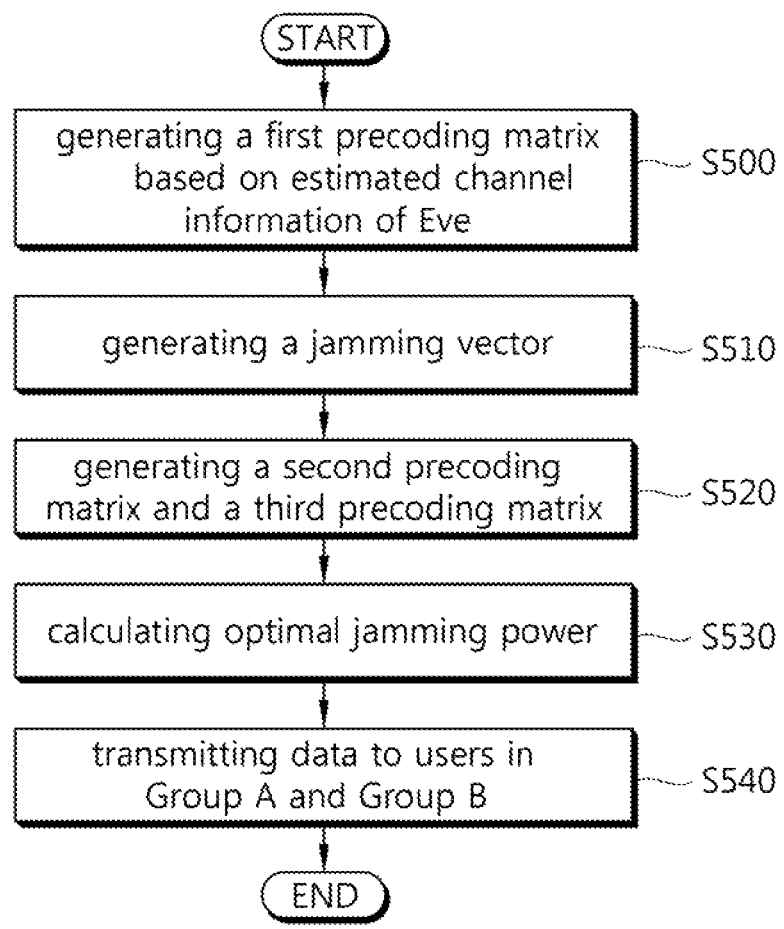
FIG. 5 is a flowchart illustrating the secure data transmission method when a base station does not know perfect CSI of Eve.

FIG. 5 is a flowchart illustrating the secure data transmission method when a base station does not know perfect CSI of Eve.

FIG. 5 illustrates the secure data generating method of the base station.

According to FIG. 5, a base station generates the first precoding matrix based on estimated channel information of Eve (step S500).

A procedure of generating the first precoding matrix $T_{1,k}^A$ is described in the equation 11. The first precoding matrix $T_{1,k}^A$ is a precoding matrix applying to data transmitting to the users in Group A, the data transmitting to whom must be kept secret at the physical layer from all other users as well as Eve. The first precoding matrix $T_{1,k}^A$ can be used for protecting users' data in Group A from other users. The first precoding matrix $T_{1,k}^A$ described in FIG. 5 is different with the first precoding matrix $T_{1,k}^A$ described in FIG. 1, because the first precoding matrix $T_{1,k}^A$ described in FIG. 5 is derived based on an assumption that the base station does not know perfect CSI of Eve.

The base station generates the jamming vector (step S510). The jamming vector is generated by the equation 16 described above.

As shown in the equation 16, a jamming precoding matrix and a column vector can be used to generate the jamming vector. The jamming precoding matrix is generated by the equation 17, and the column vector is generated by the equation 22. The jamming precoding vector is a vector used for transmitting the jamming signal to the adjacent directions of $H_E$ except the exact direction of $H_E$. The column vector is used not to interfere the users in Group A and Group B.

The base station generates the second precoding matrix and the third precoding matrix (step S520).

The second precoding matrix $T_{2,k}^A$ and the third precoding matrix $T_k^B$ can be generated by the equation 24 as described above. The second precoding matrix $T_{2,k}^A$ is a precoding matrix applying to data transmitting to the users in Group A. The second precoding matrix $T_{2,k}^A$ is used for minimizing the BER of signal transmitted to the users in Group A. The third precoding matrix $T_k^B$ is a precoding matrix applying to data transmitting to the users in Group B. The third precoding matrix $T_k^B$ is used for minimizing the BER of signal transmitted to the users in Group B. The second precoding matrix $T_{2,k}^A$ and the third precoding matrix $T_k^B$ described in FIG. 5 is different with the second precoding matrix $T_{2,k}^A$ and the third precoding matrix $T_k^B$ described in FIG. 1, because the second precoding matrix $T_{2,k}^A$ and the third precoding matrix $T_k^B$ described in FIG. 5 is derived based on an assumption that the base station does not know perfect CSI of Eve.

The base station calculates the optimal jamming power (step S530).

The optimal jamming power can be calculated by the equation 29 and equation 32. To satisfying the purpose of using the jamming signal, the base station should determine the optimal jamming power. The base station can determine the optimal jamming power by applying the higher bound and the lower bound of signal to interference jamming noise ratio (SIJNR).

The base station transmits data to users in Group A and Group B (step S540).

By using the generated precoding matrices and the jamming vector, the base station transmits the signals to users in Group A and Group B. The signals transmitted to users in Group A can be precoded by the first precoding matrix $T_{1,k}^A$ and the second precoding matrix $T_{2,k}^A$. The signals transmitted to users in Group B can be precoded by the third precoding matrix $T_k^B$. Both signals transmitted to Group A and Group B may include the jamming signal. The signals precoded by the second precoding matrix $T_{2,k}^A$ and the third precoding matrix $T_k^B$ and including the jamming signal can not be demodulated by Eve.

Figure 6:
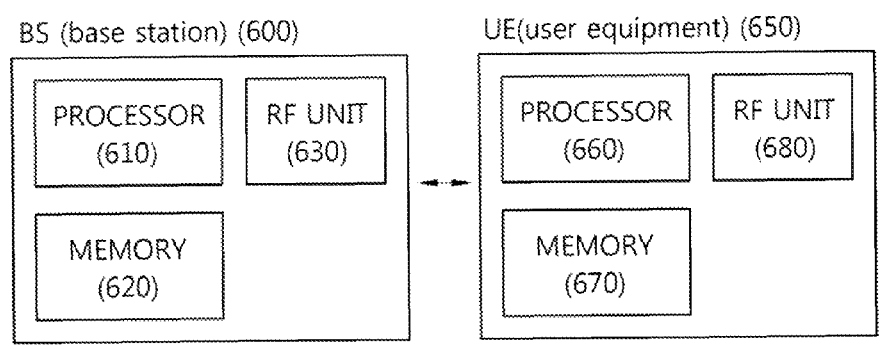
FIG. 6 is a block diagram showing a BS (base station) and a UE (user equipment).

FIG. 6 is a block diagram showing a BS and a UE.

A BS 600 includes a processor 610, a memory 620, and a radio frequency (RF) unit 630. The processor 610 implements the proposed functions, procedures, and/or methods. For example, the processor 610 can determine the first precoding matrix based on actual channel information of an eavesdropper and determine the second precoding matrix and the third precoding matrix based on the first precoding matrix and transmit a signal to at least one user in a first group or at least one user in a second group. The memory 620 is coupled to the processor 610, and stores a variety of information for driving the processor 610. The RF unit 630 is coupled to the processor 610, and transmits and/or receives a radio signal.

A UE 650 includes a processor 660, a memory 670, and an RF unit 680. The processor 660 implements the proposed functions, procedures, and/or methods. For example, the processor 660 can receive the signal precoded by the first precoding matrix, second precoding matrix or the signal precoded by the third precoding matrix. The memory 620 is coupled to the processor 610, and stores a variety of information for driving the processor 610. The RF unit 630 is coupled to the processor 610, and transmits and/or receives a radio signal.

The processors 610 and 660 may include an application-specific integrated circuit (ASIC), a separate chipset, a logic circuit, and/or a data processing unit and/or a converter for mutually converting a baseband signal and a radio signal. The memory 620 and 670 may include a read-only memory (ROM), a random access memory (RAM), a flash memory, a memory card, a storage medium, and/or other equivalent storage devices. The RF units 630 and 680 may include a base-band circuit for processing a radio signal. When the embodiment of the present invention is implemented in software, the aforementioned methods can be implemented with a module (i.e., process, function, etc.) for performing the aforementioned functions. The module may be stored in the memories 620 and 670 and may be performed by the processors 610 and 660. The memories 620 and 670 may be located inside or outside the processors 610 and 660, and may be coupled to the processors 610 and 660 by using various well-known means.

While the present invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method of transmitting a secure data signal by a base station having a processor operatively connected to a memory and a radio frequency (RF) device, the method performed by the processor and comprising:

determining, for a secured user, a first precoding matrix based on channel information of an eavesdropper;

determining, for the secured user, a second precoding matrix and determining, for a non-secured user, a third precoding matrix;

generating the secure data signal by precoding secure data for the secured user with the first precoding matrix and the second precoding matrix; and transmitting the secure data signal to the secured user in order to ensure the secure data signal is only decoded by the secured user, wherein the first precoding matrix is determined by selecting at least one column of a matrix $\tilde{V}_i$, wherein the matrix $\tilde{V}_i$ is determined based on first channel information between the base station and the secured user, second channel information between the base station and the non-secured user, and third channel information between the base station and the eavesdropper, wherein the second precoding matrix is determined based on the first precoding matrix and the first channel information, wherein the third precoding matrix is determined based on the first channel information and the second channel information, wherein the first precoding matrix is $T_{1,k}^A$, wherein the first precoding matrix $T_{1,k}^A$ is determined to satisfy:

$H_i^A T_{1,k}^A = O, i=1,\ldots,k-1,k+1,\ldots,K_A$ $H_i^B T_{1,k}^A = O, i=1,\ldots,K_B,$ $H_E T_{1,k}^A = O$ where $1 \leq i \leq K_A$ and $K_A$ is a number of secured users including the secured user and wherein $H_i^A$ is a first channel matrix representing the first channel information from the base station to each of the secured users, where $1 \leq i \leq K_B$ and $K_B$ is a number of non-secured users including the non-secured user and wherein $H_i^B$ is a second channel matrix representing the second channel information from the base station to each of the non-secured users, and wherein $H^E$ is a third channel matrix representing channel information from the base station to the eavesdropper.

2. The method of claim 1, wherein the first precoding matrix is used to precode the secure data so that the secure data is not decoded by the eavesdropper, wherein the second precoding matrix is used to precode the secure data to minimize decoding error, and wherein the third precoding matrix is used to precode non-secure data for the non-secured user.

3. A method of transmitting a secure data signal by a base station having a processor operatively connected to a memory and a radio frequency (RF) device, the method performed by the processor and comprising:

determining, for a secured user, a first precoding matrix based on estimated channel information of an eavesdropper;

determining a jamming vector based on the first precoding matrix;

determining a jamming power;

determining, for the secured user a second precoding matrix and determining, for a non-secured user, a third precoding matrix; and transmitting the secure data signal including a jamming signal to the secured user in order to ensure the secure data signal is only decoded by the secured user, wherein the first precoding matrix of the secured user is $T_{1,k}^A$, wherein the first precoding matrix $T_{1,k}^A$ is determined to satisfy:

$H_i^A T_{1,k}^A = O, i=1,\ldots,k-1,k+1,\ldots,K_A$ $H_i^B T_{1,k}^A = O, i=1,\ldots,K_B,$ $H_E T_{1,k}^A = O$ where $1 \leq i \leq K_A$ and $K_A$ is a number of secured users including the secured user and wherein $H_i^A$ is a first channel matrix representing the first channel information from the base station to each of the secured users, where $1 \leq i \leq K_B$ and $K_B$ is a number of non-secured users including the non-secured user and wherein $H_i^B$ is a second channel matrix representing the second channel information from the base station to each of the non-secured users, and wherein $H^E$ is a third channel matrix representing the estimated channel information from the base station to the eavesdropper.

4. The method of claim 3, wherein the first precoding matrix is used to precode the secure data so that the secure data is not decoded by the eavesdropper, wherein second precoding matrix is used to precode the secure data to minimize decoding error, and wherein the third precoding matrix is used to precode non-secure data for the non-secured user.

5. The method of claim 4, wherein the jamming vector is determined based on the jamming signal which is generated by a random number.

6. The method of claim 5, wherein the determining jamming power comprises:

determining a SIJNR (signal-to-interference-jamming-noise ratio) of a signal received at the eavesdropper;

determining a higher bound and a lower bound of the SIJNR; and determining the jamming power based on the higher bound and the lower bound of the SIJNR.

7. A base station for wireless communication, the base station comprising:

a radio frequency (RF) device configured to receive and transmit; and a processing device operatively connected to the RF device and configured to:

determine a first precoding matrix for a secured user based on channel information of an eavesdropper;

determine a second precoding matrix for the secured user and determine a third precoding matrix for a non-secured user;

generate a secure data signal by precoding secure data for the secured user with the first precoding matrix and the second precoding matrix; and transmit the secure data signal to the secured user in order to ensure the secure data signal is only decoded by the secured user, wherein the first precoding matrix is determined by selecting at least one column of a matrix $\tilde{V}_i$, wherein the matrix $\tilde{V}_i$ is determined based on first channel information between the base station and the secured user, second channel information between the base station and the non-secured user, and third channel information between the base station and the eavesdropper, wherein the second precoding matrix is determined based on the first precoding matrix and the first channel information, wherein the third precoding matrix is determined based on the first channel information and the second channel information wherein the first precoding matrix is $T_{1,k}^A$, wherein the first precoding matrix $T_{1,k}^A$ is determined to satisfy:

$H_i^A T_{1,k}^A = O, i=1,\ldots,k-1,k+1,\ldots,K_A$ $H_i^B T_{1,k}^A = O, i=1,\ldots,K_B,$ $H_E T_{1,k}^A = O$ where $1 \leq i \leq K_A$ and $K_A$ is a number of secured users including the secured user and wherein $H_i^A$ is a first channel matrix representing the first channel information from the base station to each of the secured users, where $1 \le i \le K_B$ and $K_B$ is a number of non-secured users including the non-secured user and wherein $H_i^B$ is a second channel matrix representing the second channel information from the base station to each of the non-secured users, and wherein $H^E$ is a third channel matrix representing channel information from the base station to the eavesdropper.

8. The base station of claim 7, wherein the first precoding matrix is used to precode the first user data so that the secure data is not decoded by the eavesdropper, wherein the second precoding matrix is used to precode the secure data to minimize decoding error, wherein the third precoding matrix is used to precode non-secure data for the non-secured user.

9. A base station configured for wireless communication, the base station comprising:

a radio frequency (RF) device configured to receive and transmit; and a processing device operatively connected to the RF device and configured to:

determine a first precoding matrix for a secured user based on estimated channel information of an eavesdropper;

determine a jamming vector based on the first precoding matrix;

determine a jamming power;

determine, for the secured user, a second precoding matrix and determine, for a non-secured user, a third precoding matrix; and transmit a secure data signal including a jamming signal to the secured user in order to ensure the secure data signal is only decoded by the secured user, wherein the first precoding matrix of the secured user is $T_{1,k}^A$, wherein the first precoding matrix $T_{1,k}^A$ is determined to satisfy:

$H_i^A T_{1,k}^A = O, i=1, \ldots, k-1, k+1, \ldots, K_A$ $H_i^B T_{1,k}^A = O, i=1, \ldots, K_B,$ $H_E T_{1,k}^A = O$ where $1 \le i \le K_A$ and $K_A$ is a number of secured users including the secured user and wherein $H_i^A$ is a first channel matrix representing the first channel information from the base station to each of the secured users, where $1 \le i \le K_B$ and $K_B$ is a number of non-secured users including the non-secured user and wherein $H_i^B$ is a second channel matrix representing the second channel information from the base station to each of the non-secured users, and wherein $H^E$ is a third channel matrix representing the estimated channel information from the base station to the eavesdropper.

10. The base station of claim 9, wherein the processor configured to determine a jamming vector is determined based on the jamming signal which is generated by a random number.

11. The base station of claim 10, wherein the processor is configured to determine jamming power by:

determining a SIJNR (signal-to-interference-jamming-noise ratio) of a signal received at the eavesdropper;

determining a higher bound and a lower bound of the SIJNR; and determining the jamming power based on the higher bound and the lower bound of the SIJNR.

* * * * *